(12) United States Patent
Brault et al.

(10) Patent No.: US 8,956,509 B2
(45) Date of Patent: *Feb. 17, 2015

(54) METHOD FOR PRODUCING A FUEL CELL ELECTRODE, INVOLVING DEPOSITION ON A SUPPORT

(75) Inventors: Pascal Brault, Saint Denis en Val (FR); Amael Caillard, Saint Loup des Vignes (FR); Alain Leclerc, Houilles (FR)

(73) Assignees: CNRS, Paris (FR); Universite d'Orleans, Orleans Cedex (FR); Aprim Vide, Houilles (FR)

( * ) Notice: Subject to any disclaimer, the term of this patent is extended or adjusted under 35 U.S.C. 154(b) by 848 days.

This patent is subject to a terminal disclaimer.

(21) Appl. No.: 12/085,874

(22) PCT Filed: Nov. 28, 2006

(86) PCT No.: PCT/FR2006/051240
§ 371 (c)(1),
(2), (4) Date: Mar. 12, 2009

(87) PCT Pub. No.: WO2007/063244
PCT Pub. Date: Jun. 7, 2007

(65) Prior Publication Data
US 2009/0283716 A1 Nov. 19, 2009

(30) Foreign Application Priority Data
Nov. 30, 2005 (FR) ..................................... 05 53668

(51) Int. Cl.
*C23C 14/00* (2006.01)
*C23C 14/32* (2006.01)
(Continued)

(52) U.S. Cl.
CPC .......... *H01M 8/0234* (2013.01); *H01M 4/8636* (2013.01); *H01M 4/881* (2013.01);
(Continued)

(58) Field of Classification Search
CPC ........................... C23C 14/542; H01M 4/8636
USPC ........................................ 204/192.1; 427/115
See application file for complete search history.

(56) References Cited

U.S. PATENT DOCUMENTS

| | | | |
|---|---|---|---|
| 5,750,013 A | 5/1998 | Lin | |
| 6,001,500 A * | 12/1999 | Bass et al. | 429/484 |
| 6,153,327 A * | 11/2000 | Dearnaley et al. | 429/487 |
| 2002/0192533 A1* | 12/2002 | Gebhardt et al. | 427/115 |
| 2006/0002844 A1* | 1/2006 | Suenaga et al. | 423/447.3 |

FOREIGN PATENT DOCUMENTS

| | | |
|---|---|---|
| DE | 199 14 680 | 12/2000 |
| FR | 2 843 896 | 3/2004 |
| WO | WO-03/044240 | 5/2003 |

OTHER PUBLICATIONS

A. Caillard, P. Brault, J. Mathias, C. Charles, R.W. Boswell, T. Sauvage, Deposition and diffusion of platinum nanoparticles in porous carbon assisted by plasma sputtering, Surface and Coatings Technology, vol. 200, Issues 1-4, Oct. 1, 2005, pp. 391-394, ISSN 0257-8972.*

(Continued)

*Primary Examiner* — Keith Hendricks
*Assistant Examiner* — Ibrahime A Abraham
(74) *Attorney, Agent, or Firm* — Im IP Law PLLC; C. Andrew Im

(57) ABSTRACT

The invention relates to a method for producing carbon electrodes by deposition on a substrate, to produce a fuel cell. The method comprises the steps of alternately and/or simultaneously depositing porous carbon and a catalyst onto the substrate by plasma spaying in a vacuum chamber. The catalyst is used to accelerate at least one of the chemical reactions that takes place in the fuel cell. The thickness of each layer of porous carbon is chosen so that the catalyst deposited on this carbon layer is distributed essentially throughout this layer, thereby by providing a layer of catalyzed carbon. The total thickness of catalyzed carbon in the electrode is less than 2 micrometers, and preferably equal to no more than 1 micrometer.

8 Claims, 2 Drawing Sheets

(51) Int. Cl.
  *H01M 8/02* (2006.01)
  *H01M 4/86* (2006.01)
  *H01M 4/88* (2006.01)
  *H01M 4/92* (2006.01)
  *H01M 8/10* (2006.01)

(52) U.S. Cl.
  CPC ........... *H01M 4/886* (2013.01); *H01M 4/8892* (2013.01); *H01M 4/92* (2013.01); *H01M 8/0245* (2013.01); *H01M 4/8642* (2013.01); *H01M 4/8657* (2013.01); *H01M 4/8803* (2013.01); *H01M 8/1004* (2013.01); *Y02E 60/523* (2013.01); *Y02E 60/50* (2013.01)
  USPC ....................................... 204/192.1; 427/115

(56) References Cited

OTHER PUBLICATIONS

Andrew T. Haug, et al., "Increasing Proton Exchange Membrane Fuel Cell Catalyst Effectiveness Through Sputter Deposition," Journal of the Electrochemical Society, vol. 149, No. 3, pp. A280-A287 (Jan. 29, 2002).

Caillard et al., "Deposition and diffusion of platinum nanoparticles in porous carbon assisted by plasma sputtering," Surface and Coatings Technology, Elsevier, Amsterdam, NL, vol. 200, No. 1-4, pp. 391-394 (Oct. 1, 2005).

\* cited by examiner

METHOD FOR PRODUCING A FUEL CELL ELECTRODE, INVOLVING DEPOSITION ON A SUPPORT

RELATED APPLICATIONS

This application claims priority from PCT/FR2006/051240 filed Nov. 28, 2006 and French Application No. FR 05 53668 filed Nov. 30, 2005, both incorporated by reference in their entireties.

TECHNICAL FIELD

The present invention concerns a method for producing carbon electrodes by deposition on a substrate, in order to produce a fuel cell made of thin layers.

BACKGROUND OF THE INVENTION

Fuel cells are used in many applications, and are particularly considered to be a possible alternative to the use of fossil fuels. In essence, these cells make it possible to directly convert a chemical energy source, for example hydrogen or ethanol, into electrical energy.

A fuel cell made of thin layers is composed of an ion-conducting membrane (or electrolyte), onto which an anode and a cathode are deposited on opposite sides.

The operating principle of such a cell is as follows: fuel is injected at the level of the cell's anode. This anode will then be the site of a chemical reaction that creates positive ions, particularly protons, and electrons. The protons are transferred through the membrane to the cathode. The electrodes are transferred through a circuit, their movement thus creating electrical energy. In addition, an oxidant that will react with the protons is injected into the cathode.

The electrodes of fuel cells are generally composed of carbon that has been catalyzed, for example with platinum.

The most common technique for producing a catalyzed electrode consists of using a carbon ink or cloth, which is deposited on a substrate and then covered with a catalyst ink, for example a platinum ink.

It is possible to successively deposit several layers of carbon and catalyst, in order to obtain a more homogenous electrode.

OBJECT AND SUMMARY OF THE INVENTION

The drawback of these techniques is that the layers are relatively thick, since the known ink deposition techniques do not make it possible to create layers that are less than about ten micrometers thick.

The invention is based on the observation that, during the operation of a fuel cell, the quantity of catalyst that is actually usable corresponds to a thickness of no more than a few micrometers. Moreover, this usable quantity of catalyst depends on the current density supplied by the cell.

It would therefore be advantageous, for both economic and environmental reasons, to be able to adapt the quantity of catalyst to the operating mode of the cell, in order to deposit only the quantity necessary.

The object of the invention is to eliminate at least one of the drawbacks mentioned above.

More precisely, the invention concerns a method for producing carbon electrodes by deposition on a substrate, in order to produce a fuel cell, the method comprising the steps of alternately and/or simultaneously by plasma spraying in a vacuum chamber depositing porous carbon and a catalyst onto the substrate, the catalyst being used to accelerate at least one of the chemical reactions that takes place in the fuel cell, the thickness of each layer of porous carbon being chosen so that the catalyst deposited on this carbon layer is distributed practically throughout this layer, thus creating a layer of catalyzed carbon, the total thickness of catalyzed carbon in the electrode being less than 2 micrometers, and preferably equal to no more than 1 micrometer.

The carbon layers are composed of a non-compact stack of carbon balls, connected to one another so as to allow the free circulation of the electrons.

Being able to deposit the porous carbon and the catalyst in an alternative and/or simultaneous way makes it possible to obtain a carbon layer which is catalyzed either homogeneously in the thickness of the layer, or according to a predetermined concentration gradient. Thus, in a process according to the invention, it is made possible to deposit, in one step, simultaneously some carbon and some catalyst, and to deposit, in previous or later steps, only one or the other component, namely the catalyst or the carbon.

In some embodiments, the process may be such that there is none step of simultaneous deposit.

Such a process makes it possible to manufacture anodes and cathodes of a fuel cell in a single vacuum chamber, carrying out a single deposit process.

Thus the process must be such that it allows deposition of both electrodes on the material forming the membrane of the fuel cell intended to be manufactured. In view of the this, for example, it is chosen a deposition temperature who doesn't exceed the stability temperature of the membrane, i.e. 150° C. at the most.

Besides, the spraying is such that, during deposition, the membrane is not altered and does not lose its properties of photonic conduction.

Those deposits, on a ionic conductive membrane, may however be made independently one from another, i.e. in separate chambers.

Thus, in one embodiment, the electrode is deposited on an ion-conducting and electrically insulating membrane, for example like a "Nafion" membrane.

Generally, the membrane comprises a carbon network material with sulfonic end groups, and possibly fluorine.

Preferably, the plasma used is a low-pressure Argon plasma, the pressure varying between 1 and 500 milli Torr (mT), excited by radio frequency, for example at a frequency equal to 13.56 Megahertz (MHz) and generated by an inductive plasma generator.

Plasma spraying makes it possible to produce thin layers, wherein the catalyst is diffused in a carbon layer whose thickness can be greater than 1 micrometer.

In addition, plasma spraying makes it possible to produce carbon layers with different morphologies, i.e., layers in which the size and the shape of the carbon grains differ. For example, the carbon grains can be spherical or even "bean" shaped. Because of these different morphologies, it is possible to produce carbon layers that are more or less porous so that, in one embodiment, the porosity of the carbon deposited is between 20% and 50%.

The method defined above can be used to produce electrodes for any type of fuel cell, such as hydrogen fuel cells like the PEMFC (Proton Exchange Membrane Fuel Cell) or methanol fuel cells like the DMFC (Direct Methanol Fuel Cell). The various components, particularly the catalyst, can be quite diverse. Thus, in one embodiment, the catalyst sprayed belongs to the group that includes:

platinum platinum alloys such as platinum ruthenium, platinum molybdenum, and platinum tin non-platinum metals such as iron, nickel and cobalt, and any alloy of these metals.

Among the most commonly used alloys are the platinum ruthenium alloy, or even the platinum ruthenium molybdenum alloy.

Thus, as explained above, in a fuel cell, the chemical reaction that takes place in the anode is a reaction that creates ions. In order for the cell to operate properly, these ions must be transmitted to the anode, which generally occurs via the membrane (electrolyte), which is made of an ion-conducting material.

If the active catalytic phase of the anode is of substantial thickness, certain ions are created at a distance from the membrane such that they cannot be properly transmitted, since the carbon and the catalyst are not ion-conducting materials.

Likewise, in the case where the fuel cell produced is such that the chemical reaction in the cathode creates negative ions, if the active catalytic phase of the cathode is too thick, some of these ions cannot be properly transmitted through the membrane.

To correct this, it is advantageous that, in one embodiment, the method includes the step of depositing, after at least one deposition of catalyst, an ion conductor such as "Nafion." Thus, the ions created in the electrode, far from the membrane, will be transferred via this deposited ion conductor.

In order to best control the quantities deposited, in one embodiment, the ion conductor is deposited by plasma spraying. This spraying is preferably performed in the same vacuum chamber as the spraying of the carbon and the catalyst.

As explained above, in a fuel cell, the active quantity of catalyst varies as a function of the current density delivered, and hence also as a function of the operating power of the cell. This variation is particularly due to the competition between the phenomena of reactant supply and an electrode's ionic resistance. Depending on the desired operating mode, it is advantageous to have greater or lesser quantities of catalyst based on the distance from the membrane.

To account for these variations, in one embodiment, the ratio between the number of atoms of catalyst and the number of atoms of carbon present in the successive layers of catalyzed carbon varies according to a given profile.

It is possible, for example, to define a profile that corresponds to the production of a fuel cell that delivers a relative highly current, for example a current higher than 800 mW/cm$^2$, i.e., a cell operating at high power, high power being considered to begin at 500 mW/cm$^2$.

In this case, in order to create a high current density, it is necessary to supply the electrode with a large quantity of fuel. In order for this high flow of fuel to be able to react properly, it is necessary to have a large quantity of catalyst near the membrane.

For this reason, in one embodiment, in order to produce a fuel cell whose operating power is higher than a given value, for example 500 mW/cm$^2$, the quantity of catalyst deposited on the carbon layer nearest the membrane of the fuel cell is such that the ratio between the number of atoms of catalyst and the number of atoms of carbon present in the layer of catalyzed carbon thus created is greater than 20%, in a thickness of less than 100 nm, which results in a total quantity of platinum that is less than or equal to 0.1 mg/cm$^2$.

Likewise, it is possible to define a profile for fuel cells operating at low power, i.e. at a power of less than 500 mW/cm$^2$. Since this cell is designed to deliver a relatively low current, it is not necessary to have a large quantity of catalyst near the membrane. In this case, the primary objective is to reduce the quantity of catalyst used in the electrode assembly as much as possible, in order to reduce costs.

For this reason, in one embodiment, in order to produce a fuel cell whose operating power is lower than a given value, for example 500 mW/cm$^2$, the quantity of catalyst deposited on the carbon layer nearest the membrane of the fuel cell is such that the ratio between the number of atoms of catalyst and the number of atoms of carbon present in the catalyzed carbon layer thus created is less than 20%.

In another embodiment, in order to obtain a fuel cell whose power is lower than a given value, for example 500 mW/cm$^2$, the quantities of catalyst deposited are such that the ratio of the number of atoms of catalyst to the number of atoms of carbon present in the catalyzed carbon layer nearest the membrane of the fuel cell is more than 10 times greater than the ratio of the number of atoms of catalyst to the number of atoms of carbon present in the catalyzed carbon layer furthest from this membrane.

In another embodiment, the method is such that the porous carbon layers deposited all have the same thickness.

The invention also concerns an electrode produced according to the production method defined above. It also concerns a fuel cell comprising at least one such electrode.

BRIEF DESCRIPTION OF THE DRAWINGS

Other characteristics and advantages of the invention will emerge from the nonlimiting description of some of its embodiments, this description being provided in connection with the figures, in which.

DETAILED DESCRIPTION OF THE EMBODIMENTS

Figure 1:
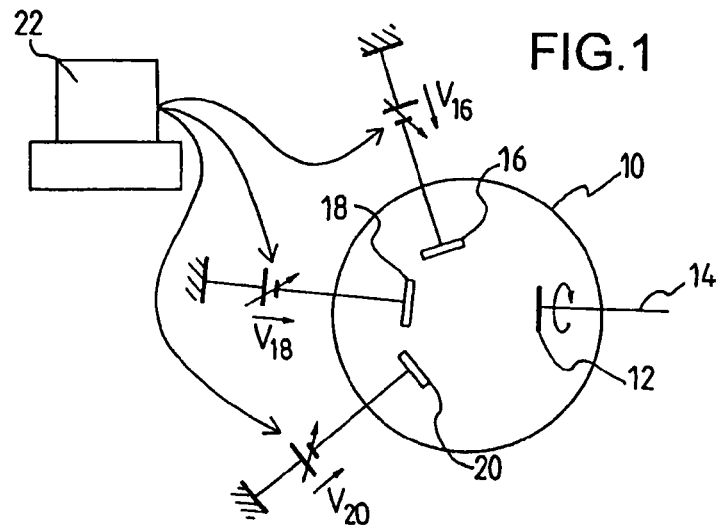
FIG. 1 presents a vacuum chamber that allows electrodes to be deposited using a method according to the invention.

FIG. 1 presents a cross-sectional view of a vacuum chamber 10, for example cylindrical in shape, inside which an electrode is deposited onto a substrate 12, for example a Nafion membrane. The substrate is installed on a substrate holder 14 that makes it possible to rotate this substrate around the normal to its main surface, in order to deposit the various substances uniformly.

Inside this chamber, there are also three targets 16, 18, 20, which are targets of porous carbon, a catalyst such as platinum, and an ion conductor such as Nafion, respectively. These targets are respectively polarized with variable voltages V16, V18 and V20. In one example, a first target is positioned facing the substrate, and the other two are positioned on either side of this first target, so that the normals to their main surfaces each form an angle of less than 45° with the normal to the substrate.

Figure 2:
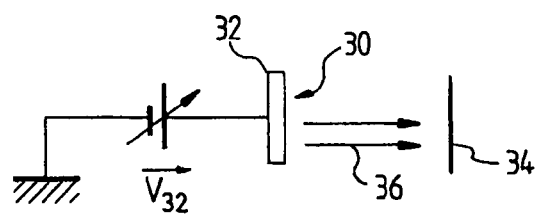
FIG. 2 illustrates the principle of the plasma spraying used in a method according to the invention.

In order to produce the electrode, the carbon, the platinum, and the Nafion are successively sprayed using a low-pressure radio frequency Argon plasma jet. The principle of this type of spraying is illustrated in FIG. 2. Argon ions 30, emitted by an argon plasma, are sent to a target 32 of material to be sprayed on a substrate 34. The plasma state is produced by a high-power electrical discharge through the argon gas. The target is polarized with a variable voltage V32. As a result of the impact of these ions 30 on the target, the atoms of the target are released through a series of collisions. These atoms are then projected (36) onto the substrate 34.

Inside the chamber 10, argon ions are continuously bombarded onto the three targets. The three targets are then successively fed so as to deposit on the membrane 12 a layer of porous carbon, then the catalyst, and finally the ion conductor. These three successive sprayings make it possible to form on the substrate a layer of catalyzed carbon that also contains atoms of an ion conductor.

Figure 3:
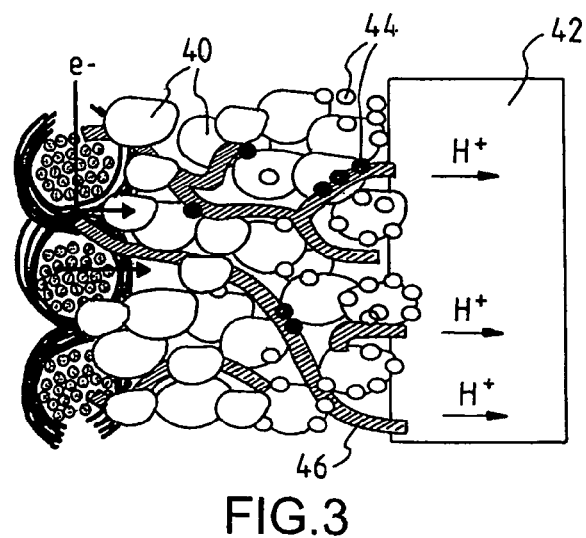
FIG. 3 shows the structure of a carbon layer onto which a catalyst and an ion conductor have been sprayed.

A layer of this type is represented in FIG. 3. During the first spraying, porous carbon balls, generally with a diameter between 30 and 100 nm, are deposited on a substrate 42. During a second spraying, balls of platinum 44, generally with a diameter of less than 3 nm, are diffused into the layer of carbon and are thereby distributed among the carbon balls 40 deposited previously. To complete the process, during a third spraying, an ion conductor (46) such as Nafion is sprayed onto the catalyzed carbon layer.

The operation consisting of these three sprayings is then repeated several times, in order to form an electrode having the desired thickness.

The thickness of each porous carbon layer is chosen so as to allow the catalyst deposited subsequently to be diffused practically throughout the thickness of this carbon layer. The thickness of each carbon layer is preferably substantially less than 1 micrometer.

To facilitate the production process, the various carbon layers preferably have the same thickness. It is possible, however, to produce carbon layers of different thicknesses.

The polarization voltages V16, V18 and V20 (FIG. 1) being variable, it is possible to control the number of atoms projected in each spraying. This makes it possible to form electrodes having profiles for the distribution of catalyst through the thickness that are adapted to the desired use of the fuel cell.

If it is also necessary to deposit an ion conductor, for the reasons mentioned above, this conductor must be distributed in the same way as the catalyst in order to ensure the transmission of the protons through the membrane.

Figure 4A:
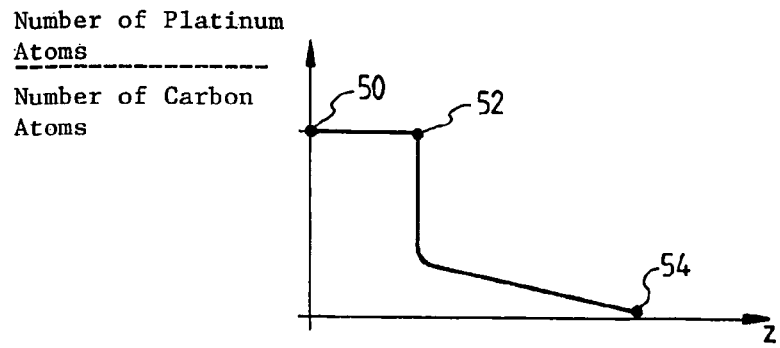
FIGS. 4a and 4b represent two profiles for the distribution of a catalyst in an electrode for fuel cells operating at high and low power, respectively.
Figure 4B:
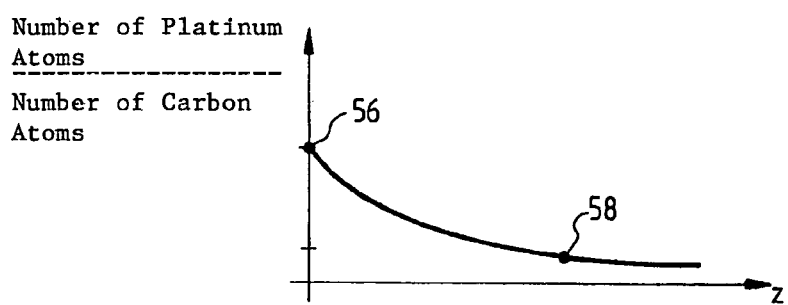

Two examples of these profiles are illustrated in FIGS. 4a and 4b. In these two curves, the axis of the abscissas represents the thickness of the electrode, the abscissa 0 corresponding to the point nearest the membrane, and the axis of the ordinates represents the ratio between the number of platinum atoms and the number of carbon atoms present in the electrode.

FIG. 4a presents an electrode profile that is particularly adapted to high power operation, i.e. for powers higher than 500 mW/cm$^2$.

At the point 50, the ratio between the number of platinum atoms and the number of carbon atoms is 50%, and the quantity of platinum is 10 grams per cubic centimeter. This quantity remains constant in a thickness of around 0.33 micrometer, until it reaches the cutoff point 52. From that point on, the quantity of platinum decreases quite rapidly, reaching a value of nearly zero for an electrode thickness equal to 1 micrometer (54).

FIG. 4b presents an electrode profile that is particularly adapted to low power operation, i.e. for powers lower than 500 mW/cm$^2$.

At the point 56, the ratio between the number of platinum atoms and the number of carbon atoms is 20%, and the quantity of platinum is 6 grams per cubic centimeter. This quantity diminishes progressively until it reaches (58) a value of 0.6 gram per cubic centimeter, for a thickness of less than 1 micrometer, then remains constant up to a maximum thickness of 2 micrometers.

Figure 5:
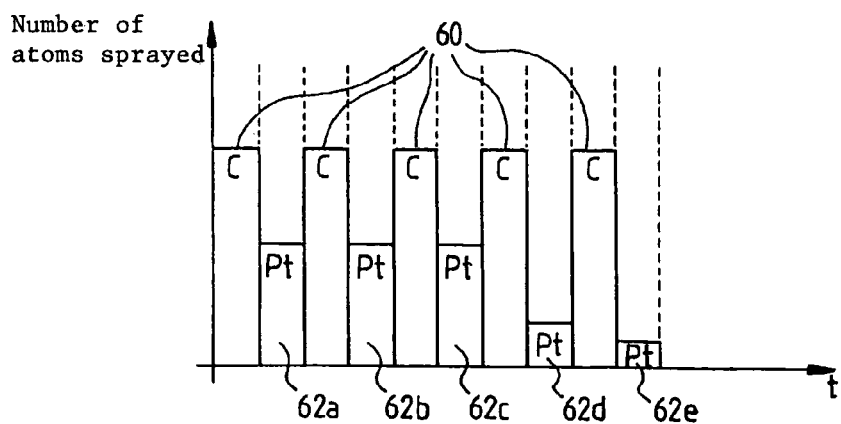
FIG. 5 is a timing diagram that shows the alternating sprayings of carbon and platinum in a method according to the invention.

One way to obtain these profiles is to spray the same quantity of carbon in each spraying, and to vary the quantity of platinum sprayed. This type of sequencing is illustrated by the timing diagram in FIG. 5.

In this timing diagram, the axis of the abscissas represents time, and the axis of the ordinates represents the number of atoms sprayed.

We see in this timing diagram that the number of atoms of porous carbon sprayed is the same each time (60).

On the other hand, the number of platinum atoms varies. In this example, during the first three passes 62a, 62b and 62c, the number of platinum atoms sprayed is identical for all three passes. However, this number decreases sharply during passes 62d and 62e. This timing diagram shows only the initial sprayings of the deposition. After that, for example, the carbon sprayings remain the same, and the platinum sprayings continue to decrease.

The total number of passes is generally between 2 and 20, and the time required to deposit the electrode is less than 10 minutes. In one example, all of the passes have the same duration, equal to 30 seconds, and there are 10 carbon deposition phases and 10 catalyst deposition phases.

An electrode deposited in accordance with a timing diagram of this type has a profile similar to the one in FIG. 4a. In essence, the first three sprayings of platinum (62a through 62c) correspond to the portion of the profile located between the points 50 and 52 (FIG. 4a), while the sprayings 62d and so on correspond to the portion located between the points 52 and 54 (FIG. 4a).

In a variant, one (or more) spraying(s) of platinum can be followed by a spraying of ion conductor.

In order to perform electrode depositions based on a chosen timing diagram, it is possible, for example, to use a computer 22 (FIG. 1) that contains the file in memory and is used to control the variable voltages V16, V18 and V20 so as to obtain the desired profile.

The invention claimed is:

1. A method for producing carbon electrodes by deposition on a substrate, in order to produce a fuel cell, the method comprising the steps of:
   alternately depositing layers of porous carbon and a catalyst onto the substrate by plasma sputtering in a vacuum chamber, the catalyst being used to accelerate at least one of the chemical reactions that takes place in the fuel cell;
   varying a thickness and porosity of each layer of the porous carbon to vary a number of catalyst atoms deposited on said each layer of the porous carbon such that the catalyst atoms are homogeneously distributed within each layer of porous carbon layer and the number of catalyst atoms in successive layers of a multi-layered catalyzed carbon varies according to a profile, the total thickness of catalyzed carbon in an electrode being less than 2 micrometers; and
   wherein a ratio of the number of catalyst atoms deposited to a number of carbon atoms present in a catalyzed carbon layer nearest a membrane of the fuel cell is more than 10 times greater than the ratio of the number of catalyst atoms deposited to the number of carbon atoms present in a catalyzed carbon layer furthest from the membrane.

2. The method of claim 1, further comprising the step of depositing the electrode on an ion-conducting and electrically insulating membrane.

3. The method of claim 1, further comprising the step of depositing the electrode on a "Nafion" membrane type.

4. The method of claim 1, wherein the step of alternately depositing comprises the step of plasma sputtering the porous carbon having porosity between 20% and 50%.

5. The method of claim 1, wherein the step of alternately depositing comprises the step of plasma sputtering the catalyst selected from a group consisting of: platinum, platinum alloys, platinum ruthenium, platinum molybdenum, platinum tin, non-platinum metals, iron, nickel and cobalt, and alloys thereof.

6. The method of claim 1, further comprising the step of depositing an ion conductor or "Nafion" after at least one deposition of the catalyst.

7. An electrode produced in accordance with the method of claim 1.

8. A fuel cell comprising at least one electrode of claim 7.

* * * * *